US012594546B2

(12) United States Patent
Lu et al.

(10) Patent No.: US 12,594,546 B2
(45) **Date of Patent: *Apr. 7, 2026**

(54) TERNARY COMPOSITE MATERIAL HAVING NIO NANOSHEET/BIMETALLIC CeCuO$_X$ MICROSHEET CORE-SHELL STRUCTURE, AND PREPARATION AND APPLICATION THEREOF

(71) Applicant: SOOCHOW UNIVERSITY, Suzhou (CN)

(72) Inventors: Jianmei Lu, Suzhou (CN); Dongyun Chen, Suzhou (CN); Jun Jiang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 466 days.

This patent is subject to a terminal disclaimer.

(21) Appl. No.: 18/011,173

(22) PCT Filed: Jan. 31, 2021

(86) PCT No.: PCT/CN2021/074577
§ 371 (c)(1),
(2) Date: Feb. 18, 2023

(87) PCT Pub. No.: WO2022/126843
PCT Pub. Date: Jun. 23, 2022

(65) Prior Publication Data
US 2023/0241590 A1     Aug. 3, 2023

(30) Foreign Application Priority Data

Dec. 14, 2020     (CN) .......................... 202011476774.3

(51) Int. Cl.
| | |
|---|---|
| *B01J 35/30* | (2024.01) |
| *B01D 53/86* | (2006.01) |
| *B01J 23/755* | (2006.01) |
| *B01J 23/83* | (2006.01) |
| *B01J 35/45* | (2024.01) |
| *B01J 37/02* | (2006.01) |
| *B01J 37/03* | (2006.01) |
| *B01J 37/04* | (2006.01) |
| *B01J 37/08* | (2006.01) |

(52) U.S. Cl.
CPC ............ *B01J 23/83* (2013.01); *B01D 53/864* (2013.01); *B01J 23/755* (2013.01); *B01J 35/393* (2024.01); *B01J 35/45* (2024.01); *B01J 37/0219* (2013.01); *B01J 37/0221* (2013.01); *B01J 37/031* (2013.01); *B01J 37/04* (2013.01); *B01J 37/088* (2013.01); *B01D 2255/2065* (2013.01); *B01D 2255/20753* (2013.01); *B01D 2255/20761* (2013.01); *B01D 2257/7027* (2013.01); *B01D 2257/708* (2013.01); *B01J 2235/30* (2024.01)

(58) Field of Classification Search
None
See application file for complete search history.

(56) References Cited

FOREIGN PATENT DOCUMENTS

| | | | |
|---|---|---|---|
| CN | 102416328 | * | 4/2012 |
| CN | 103447047 | A | 12/2013 |
| CN | 106732612 | * | 5/2017 |
| CN | 110787788 | * | 2/2020 |
| CN | 110787788 | A | 2/2020 |

OTHER PUBLICATIONS

English Translation of Yang CN (110787788) Feb. 14, 2020 (Year: 2020).*

* cited by examiner

*Primary Examiner* — Sheng H Davis
(74) *Attorney, Agent, or Firm* — SZDC Law PC

(57) ABSTRACT

Provided are a ternary composite material having a NiO nanosheet/bimetallic CeCuOx microsheet core-shell structure, and a preparation method therefor, and an application thereof. CeCuOx has a large specific surface area and high stability. A NiO/CeCuOx core-shell structured composite material catalyst is prepared by growing NiO nanosheets on the surface of CeCuOx by low-temperature hydrothermal treatment and heat treatment. The bimetallic CeCuOx microsheet shows better catalytic performance for toluene than monometallic oxides, i.e., copper oxide and cerium oxide. The further growth of the NiO nanosheets having different concentrations effectively improves catalytic activity. A 3Ni/CeCuOx catalyst can realize complete catalysis of toluene at 210° C.

7 Claims, 3 Drawing Sheets

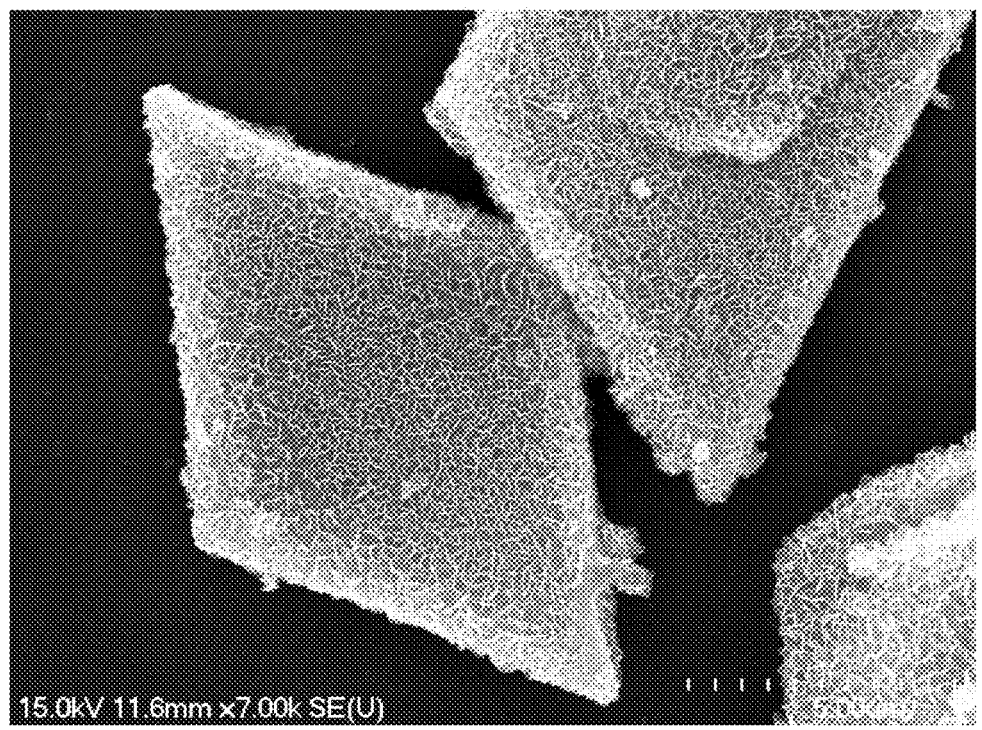
*FIG. 3*
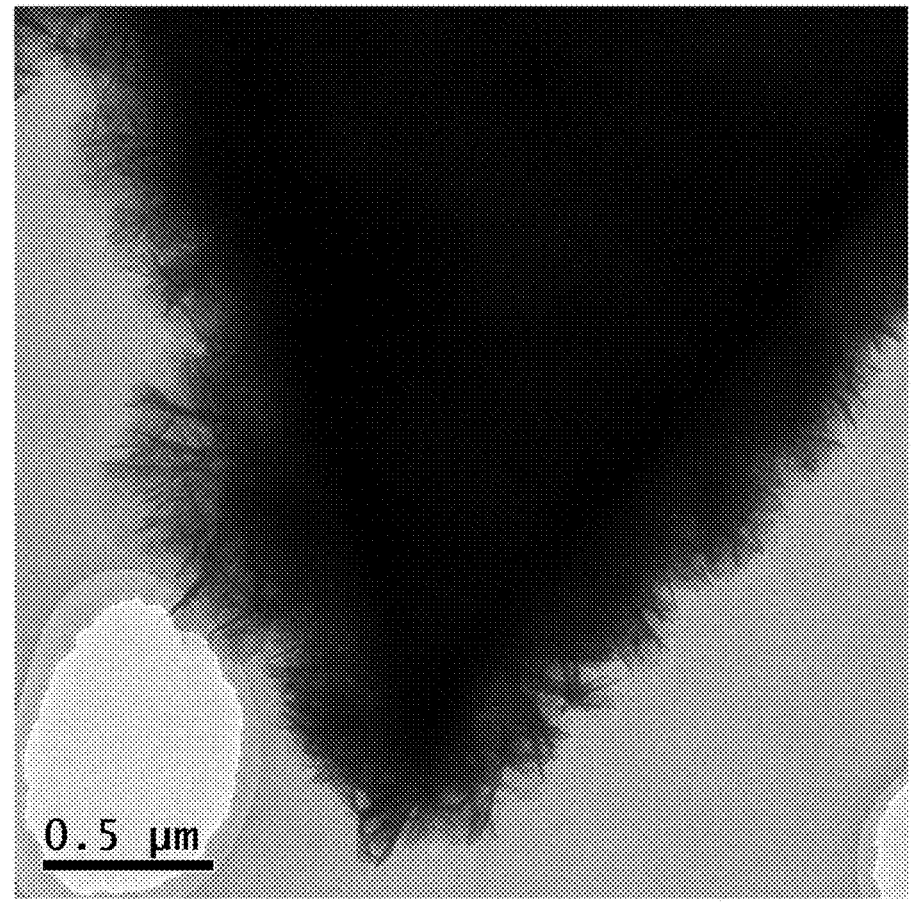
*FGI. 4*

TERNARY COMPOSITE MATERIAL HAVING NIO NANOSHEET/BIMETALLIC CeCuO$_x$ MICROSHEET CORE-SHELL STRUCTURE, AND PREPARATION AND APPLICATION THEREOF

This application is the National Stage Application of PCT/CN2021/074577, filed on Jan. 31, 2021, which claims priority to Chinese Patent Application No. 202011476774.3, filed on Dec. 14, 2020, which is incorporated by reference for all purposes as if fully set forth herein.

TECHNICAL FIELD

The present invention relates to the technical field of nanocomposite materials, and in particular, to the preparation of a NiO nanosheet and bimetallic CeCuO$_x$ microsheet core-shell structure composite material and the application thereof in catalytic heating treatment of toluene.

BACKGROUND

A volatile organic compound (VOC) having a boiling point between room temperature and 260° C. is considered to be a major factor causing global air pollution, especially environmental pollution, such as ozone, photochemical smoke, and secondary aerosol caused by toluene. The use of effective techniques will reduce damage to the environment and human health. Low temperature catalytic oxidation techniques are believed to be an efficient and economical process for removing toluene, resulting in extensive search interest.

In recent years, scientists have made great efforts to develop more efficient catalysts that can catalyze the oxidation of VOCs at lower temperatures. Generally speaking, there are two types of highly efficient catalysts for total VOC oxidation, which are supported noble metal and transition metal oxide catalysts. Although noble metal-based catalysts are considered better catalysts for VOC catalytic oxidation and have attracted much attention, they have the disadvantages of poor thermal stability and high cost, high surface energy and easy agglomeration. Therefore, efforts are being made to design different multi-component transition metal oxide nanostructured catalysts, such as core-shell structures and hollow porous materials with high surface areas.

Transition metal oxide catalysts are much cheaper than expensive and rare noble metals. They are viable and sufficiently active in some reactions. In order to achieve the purpose of developing alternative to noble metal catalysts and lowering the reaction temperature, it is necessary to conduct research on multiple transition metal oxide catalysts. As typical transition metal oxides, CeO$_2$, NiO and CuO have the advantages of low cost and high thermal stability. Therefore, in view of the current situation, it is necessary to develop an effective method to prepare new multi-component composite catalysts.

SUMMARY OF THE INVENTION

Technical Problem

The purpose of the present invention is to provide a NiO nanosheet and bimetallic CeCuO$_x$ microsheet core-shell structure composite material by using a water bath thermal reaction method to form a NiO nanosheet onto a bimetallic CeCuO$_x$ microsheet, so as to achieve the purpose of efficiently treating gas pollutants, such as toluene gas, at a low temperature.

Technical Solution

In order to achieve the above purpose, the present invention adopts the following specific technical solution: a ternary NiO nanosheet and bimetallic CeCuO$_x$ microsheet core-shell structure composite material is prepared by a method that includes the following steps:

(1) mixing a cerium salt, a copper salt, an organic acid, and a solvent, performing a solvothermal reaction, and calcining a reaction product of the solvothermal reaction to obtain a CeCuOx microsheet.

(2) performing a water bath reaction of a mixture of a nickel salt, urea, and the CeCuOx microsheet in an alcohol/water mixed solvent, and calcining a reaction product of the water bath reaction to obtain the ternary NiO nanosheet and bimetallic CeCuOx microsheet core-shell structure composite material.

Specifically, (1) dissolving a cerium salt, a copper salt and terephthalic acid in a solvent, mixing, placing the mixture into a high-pressure reaction kettle for a solvothermal reaction, and centrifugally washing, drying and calcining the reaction product to obtain the CeCuOx micro-sheet.

(2) dissolving a nickel salt and urea in a mixed solution of ethanol and water, adding CeCuOx powder for a water bath reaction, and centrifugally washing, drying and calcining the reaction product to obtain the ternary NiO nanosheet and bimetallic CeCuOx microsheet core-shell structure composite material.

In the present invention, the cerium salt is cerium nitrate hexahydrate, and the copper salt is copper nitrate trihydrate; the solvent is DMF (N, N-dimethylformamide); the nickel salt is nickel nitrate; and in the alcohol/water mixed solvent, the alcohol is ethanol, preferably a volume ratio of alcohol and water is 1:1.

Preferably, in the ternary NiO nanosheet and bimetallic CeCuOx microsheet core-shell structure composite material, a weight of the NiO nanosheet is 1-5 times a weight of the bimetallic CeCuOx microsheet. For example, the weight ratio of the NiO nanosheet to the bimetallic CeCuOx microsheet is 1:1, 3:1, 5:1.

In the present invention, the dissolution in the solvent is at room temperature, a time is 2-3 hours; the solvothermal reaction is conducted in a high pressure reactor, a reaction temperature is 80° C.-90° C., a reaction time is 24-25 hours, preferably, the reaction temperature is 80° C., and the reaction time is 24 hours; and the calcination is performed in air, a calcination temperature is 350° C.-400° C., a calcination time is 4-4.5 hours, preferably, the calcination temperature is 350° C., a heating rate is 3° C./min during calcination, and the calcination time is 4 hours.

In the present invention, the water bath reaction is conducted 80° C.-90° C., a reaction time is 1.5-3 hours, preferably at 80° C. for 2 hours; the calcination is performed in air, the calcination temperature is 350° C.-400° C., the calcination time is 4-4.5 hours, preferably, the calcination temperature is 350° C., the heating rate is 3° C./min during calcination, and the calcination time is 4 hours.

In the present invention, the molar ratio of cerium salt, copper salt and terephthalic acid in step (1) is 2:(1.0-1.1):(4.0-4.1); in step (2), a molar ratio of nickel salt to urea is 1:(5.0-5.1); and the nickel salt is Ni(NO$_3$)$_2$.

The present invention first uses a bimetallic metal-organic framework as a catalyst precursor to prepare a binary metal oxide catalyst having excellent activity (CeCuOx), which has a large specific surface area and good stability. The large specific surface area can promote catalytic performance, forming a good catalyst material. A nickel oxide nanosheet is then formed on the surface of the CeCuOx by a low-temperature water bath heating and heat treatment method, and preparing the yNiO/CeCuOx core-shell structure composite material catalyst with different ratios by adjusting a mass ratio of NiO/CeCuOx. The NiO nanosheet forms on the bimetallic CeCuOx microsheet, obtaining a morphology, further increasing the contact area. The catalytic active site is increased, the catalytic effect is improved, and the method is efficient and economical.

After calcination treatment, an amount of NiO nanosheet and bimetallic CeCuOx microsheet core-shell structure composite material is placed into a toluene environment with a certain concentration, and the composite material is heated and catalyzed by using a fixed bed reactor, so that low-temperature catalytic oxidation of toluene is realized. GCMS-QP 2020 test shows that toluene is completely catalyzed.

The present invention further discloses the application of the above-mentioned NiO nanosheet and bimetallic CeCuOx microsheet core-shell structure composite material in low-temperature catalytic oxidation of toluene.

In the method for low-temperature thermal catalytic treatment of toluene, the NiO nanosheet and bimetallic CeCuOx microsheet core-shell structure composite material is placed in a toluene-containing environment, toluene treatment is completed by using a fixed bed reactor. Preferably, the temperature of the low-temperature complete catalytic oxidation of toluene gas is 210° C.

BENEFICIAL EFFECT

The advantages of the present invention: 1. the NiO nanosheet and bimetallic CeCuOx microsheet core-shell structure composite material disclosed by the present invention has a large surface area, a uniform pore size, and a controllable structure. The growth of the nickel oxide increases the oxygen vacancy and contact area of the carrier, which significantly improves the catalytic performance of the carrier catalyst. The nanosheet grows uniformly on the bimetallic CeCuOx microsheet to form a core-shell structure, so that the large specific surface area can promote the catalytic performance, increase the reaction active site. It is a good multi-element transition metal-type catalyst material.

2. According to the method of preparing the NiO nanosheet and bimetallic CeCuOx microsheet core-shell structure composite material disclosed by the invention, the loading of noble metal particles is avoided, the cost of the material is greatly reduced, and the nickel oxide grows on the CeCuOx microsheet nanosheet, so that the experimental process is relatively simple, the catalytic performance on toluene is excellent. Therefore, the NiO nanosheet and bimetallic CeCuOx microsheet core-shell structure composite material has high economic practicability and research value.

BRIEF DESCRIPTION OF THE DRAWINGS

FIG. 3 is a scanning electron microscope (SEM) of the 3Ni/CeCuOx core-shell structure composite material.

FIG. 4 is a transmission electron microscope (TEM) diagram of the 3Ni/CeCuOx core-shell structure composite material.

DETAILED DESCRIPTION

The preparation method of the NiO nanosheet and bimetallic CeCuOx microsheet core-shell structure composite material disclosed by the invention includes the following steps: (1) dissolving a cerium salt, a copper salt and terephthalic acid ($H_2BDC$) in a solvent, mixing, placing the mixture into a high-pressure reactor, carrying out a solvothermal reaction, and carrying out centrifugal washing, drying and calcining treatment to obtain a CeCuOx microsheet.

(2) dissolving a nickel salt and urea in a mixed solution of ethanol and water, adding CeCuOx powder to conduct a reaction heating with a water bath, and then centrifugal washing, drying, and calcining to obtain the NiO nanosheet and bimetallic CeCuOx microsheet core-shell structure composite material.

The starting materials used in the present invention are conventional commercially available, and the preparation method and test method are conventional methods in the art.

Figure 1:
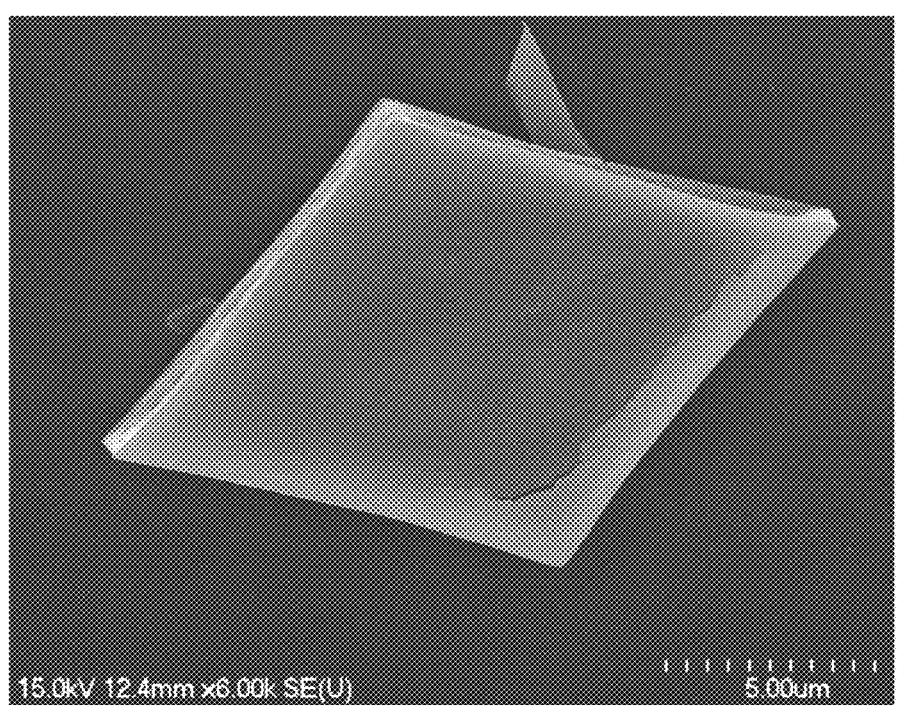
FIG. 1 is a scanning electron microscope (SEM) image of a CeCuOx microsheet.
Figure 2:
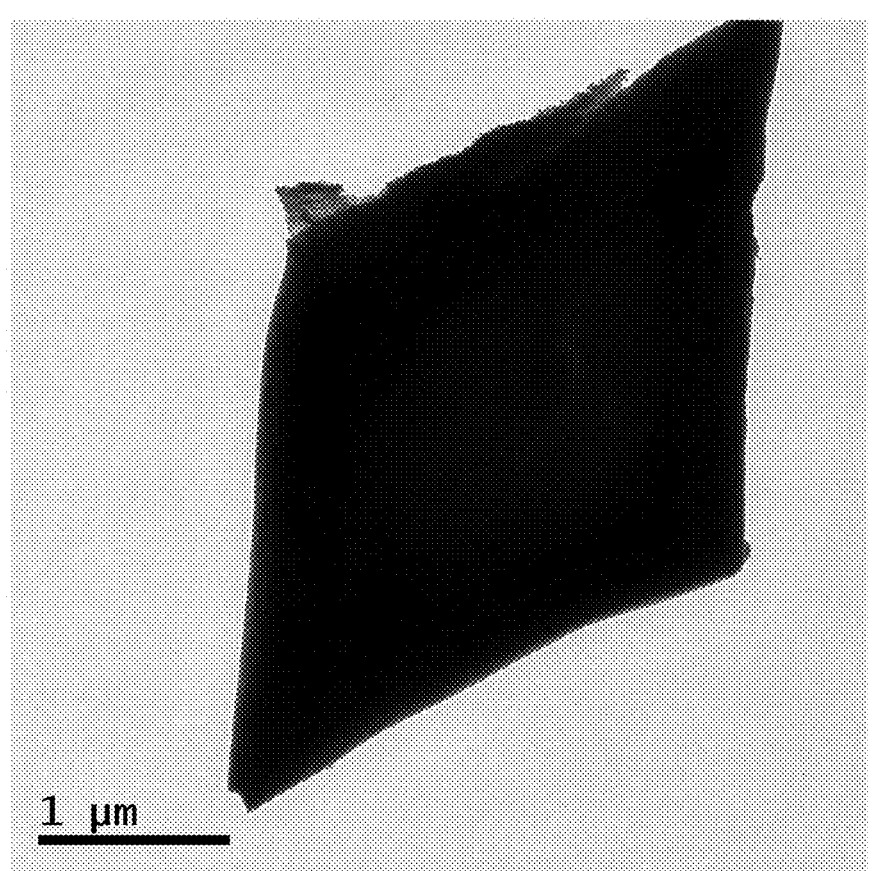
FIG. 2 is a transmission electron microscope (TEM) diagram of the CeCuOx microsheet.

Example 1: the preparation of CeCuOx including the following steps: dissolving $Ce(NO_3)_3 \cdot 6H_2O$ (0.868 g, 2 mmol) and $Cu(NO_3)_2 \cdot 3H_2O$ (0.242 g, 1 mmol) in DMF (40 mL) at room temperature, and stirring at 1000 rpm for 2 h; dissolving $H_2BDC$ (0.664 g, 4 mmol) in DMF (40 mL), and stirring at 1000 rpm for 2 h. The two solutions were then mixed with ultrapure water (20 mL) in a stainless steel autoclave, thermally reacted at 80° C. for 24 hours, washed several times with DMF and ethanol, then dried under vacuum at 65° C. for 6 h, and then calcined at 350° C. in air for 4 h, increasing the heating temperature from room temperature to 350° C. at a rate of 3° C./min to obtain the CeCuOx microsheet. FIG. 1 is an SEM image of a CeCuOx microsheet, and FIG. 2 is a TEM image of the CeCuOx microsheet; and it can be seen from figures that the microsheet has a two-dimensional layered structure, a regular parallelogram morphology.

Example 2: the preparation of the ternary NiO nanosheet and bimetallic CeCuOx microsheet core-shell structure composite material include the following specific steps: an amount of nickel oxide being 3 times of CeCuOx, dissolving $Ni(NO_3)_2$ and urea in a molar ratio of 1:5 in a 100 mL water/alcohol of 1/1 volume ratio, adding 100 mg of prepared CeCuOx microsheet powder, and reacting the obtained solution at 80° C. for 2 hours under stirring. The reaction mixture was filtered and washed, then dried at 90° C. and calcined at 350° C. under an air atmosphere at a heating rate of 3° C./min for 4 h to obtain a ternary NiO nanosheet and bimetallic CeCuOx microsheet core-shell structure composite material, named as 3Ni/CeCuOx (representing the weight ratio of NiO nanosheet to bimetallic CeCuOx microsheet of 3:1), and performance and characterization testing were performed.

Figure 5:
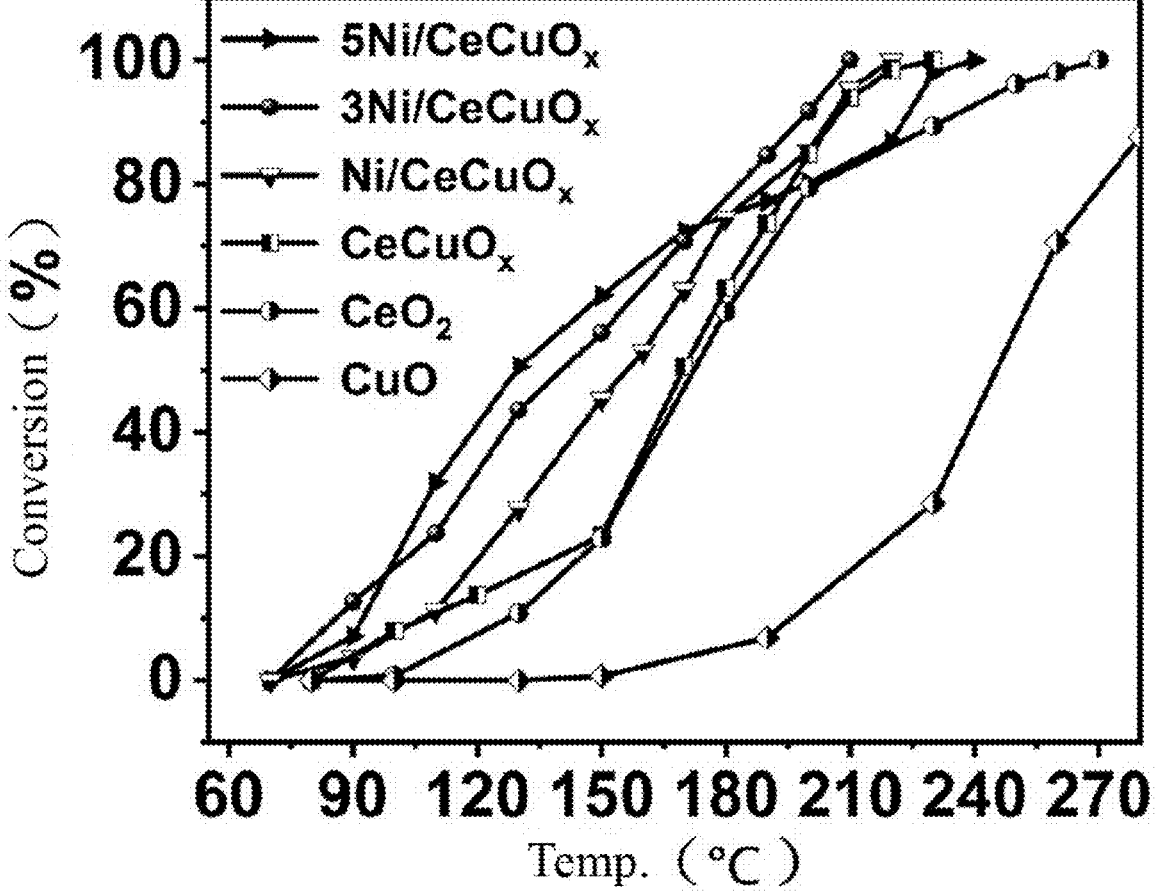
FIG. 5 is a graph of the thermal catalytic effect of the NiO nanosheet and bimetallic CeCuOx microsheet core-shell structure composite material on toluene gas.

FIG. 4 is an SEM image of the 3 Ni/CeCuOx composite material, and FIG. 5 is a TEM image of the 3Ni/CeCuOx composite material. It can be seen from the figures that the nickel oxide successfully grows on the CeCuOx microsheet, and the distribution is uniform.

The amount of $Ni(NO_3)_2$ was changed to obtain materials with the weight ratio of NiO nanosheet to the bimetallic CeCuOx microsheet being 1:1, 5:1, named as NiCeCuOx, 5NiCeCuOx, respectively.

Example 3: the thermal catalytic condition of the p-toluene gas by the ternary NiO nanosheet and bimetallic CeCuOx microsheet core-shell structure composite material was that the toluene concentration is 50 ppm (air is used as a filling gas, purchased from Messer Air Liquide Co. Ltd.), the amount of the catalyst was 50 mg, the catalyst was fixed on a fixed bed reactor through a U-shaped pipe according to a conventional method, the catalytic effect of the composite material on toluene gas under the heating condition was analyzed through gas chromatography, and the test condition was 36000 ml (h g).

FIG. 5 is a graph of the thermal catalytic effect of the ternary NiO nanosheet and bimetallic CeCuOx microsheet core-shell structure composite material on toluene gas. As shown in FIG. 5, the present invention can be applied to conversion of toluene at lower temperatures. Toluene pollution in air is mainly derived from building materials, indoor decorative materials, living and office supplies, outdoor industrial waste gas, automobile exhaust, photochemical smoke and the like, and the toluene specific catalytic effect is analyzed by gas chromatography, and the toluene conversion rate calculation method is shown in equation (1):

$$\eta = \frac{C_0 - C}{C_0} \times 100\%$$

$C_0$ and C are the initial concentration and test concentration of toluene in the experiment, respectively (tested once every 15 minutes).

As shown in the comparative results of FIG. 5, the catalytic performance of the bimetallic CeCuOx sample with large sheet morphology is obviously superior to that of a single metal $CeO_2$ and CuO sample, and the advantages of the bimetallic sample morphology structure are proved. In addition, nickel oxide is grown on the CeCuOx microsheet, so that the concentration of oxygen vacancies is further improved, the catalytic performance is obviously improved, the uniform growth of nickel oxide also greatly improves catalytic performance of the nickel oxide, and the use of noble metals is avoided. Therefore, the 3 Ni/CeCuOx composite catalyst is relatively economical and efficient.

Comparative Example: performing the solvothermal synthesis at 80° C. in the preparation example C for 24 hours was changed to performing the solvothermal synthesis at 80° C. for 48 hours, and the remaining conditions were unchanged. CeCuOx was obtained. Microsheet was prepared according to the method of Example 2. 3Ni/CeCuOx was prepared. The same toluene conversion test was performed. Toluene gas cannot be completely catalyzed at 210° C., i.e., the conversion rate is less than 100%.

The heating rate of 3° C./min in Example 1 was changed to 10° C./min. The remaining conditions were unchanged. CeCuOx microsheet was prepared according to the method of Example 2. 3Ni/CeCuOx was prepared. The same toluene conversion test was performed. The conversion rate was less than 95% at 210° C.

The temperature 350° C. in Example 2 was changed to 400° C. The remaining conditions were unchanged. 3Ni/CeCuOx was prepared. The same toluene conversion test was performed. The conversion rate was less than 92% at 210° C.

Comparative Example: dissolving $Ni(NO_3)_2$ and urea in a molar ratio of 1:5 in a 100 mL solution having a water/alcohol volume ratio of 1/1, then placing the obtained solution under conventional stirring at 80° C. for 2 reaction hours, drying at 90° C., calcining at 350° C. in an air atmosphere at a heating rate of 3° C./min to obtain a solid material, performing the same toluene conversion test, and converting being less than 30% at 210° C.

By analyzing the above experiments, it is indicated that the nickel oxide nanosheet using the technical solution of the present invention can successfully grow to the CeCuOx microsheet to form a core-shell structure composite material. The process is simple and feasible, the growth of nickel oxide is very uniform, and the composite material in a certain proportion has a relatively good catalytic activity for toluene. The NiO nanosheet and bimetallic CeCuOx microsheet core-shell structure composite material has a relatively large specific surface area, a uniform pore size and a controllable structure; the growth of nickel oxide increases the oxygen vacancy and contact area of the carrier, which significantly improves the catalytic performance of the carrier catalyst; and the nanosheet grows uniformly on the bimetallic CeCuOx microsheet to form a core-shell structure. The large specific surface area can promote the catalytic performance, increase the reaction active site, and be a good multi-element transition metal-type catalyst material. Meanwhile, the loading of noble metal particles is avoided, the cost of the material is greatly reduced, the experimental process is relatively simple, and the catalytic performance on toluene is excellent, so that the catalyst provided by the invention further realizes the purpose of economic practicability.

The invention claimed is:

1. A method of preparing a ternary NiO sheet and bimetallic $CeCuO_x$ sheet core-shell structure composite material, comprising the following steps:
    (1) mixing a cerium salt, a copper salt, an organic acid, and a solvent, performing a solvothermal reaction, and calcining a reaction product of the solvothermal reaction to obtain a $CeCuO_x$ sheet;
    (2) performing a water bath reaction of a mixture of a nickel salt, urea, and the $CeCuO_x$ sheet in an alcohol/water mixed solvent, and calcining a reaction product of the water bath reaction to obtain the ternary NiO sheet and bimetallic $CeCuO_x$ sheet core-shell structure composite material,
    wherein in step (1), a reaction temperature of the solvothermal reaction is 80° C.-90° C. and a reaction time is 24-25 hours; the calcination is performed in air, a calcination temperature is 350° C.-400° C., and a calcination time is 4-4.5 hours.

2. The method of preparing the ternary NiO sheet and bimetallic $CeCuO_x$ sheet core-shell structure composite material according to claim 1, wherein in step (2), a reaction temperature of the water bath reaction is 80° C.-90° C., and a reaction time is 2-2.5 hours; the calcination is performed in air, a calcination temperature is 350° C.-400° C., and a calcination time is 4-4.5 hours.

3. The method of preparing the ternary NiO sheet and bimetallic $CeCuO_x$ sheet core-shell structure composite material according to claim 1, further comprising:
    applying the ternary NiO sheet and bimetallic $CeCuO_x$ sheet core-shell structure composite material in a low-temperature thermal catalytic treatment of a gas pollutant.

4. The application of method of preparing the ternary NiO sheet and bimetallic $CeCuO_x$ sheet core-shell structure composite material according to claim 3, wherein the gas pollutant is toluene.

5. The method of preparing the ternary NiO sheet and bimetallic $CeCuO_x$ sheet core-shell structure composite material according to claim 1, wherein in step (1), a molar ratio of the cerium salt, the copper salt and the organic acid is 2:(1.0-1.1):(4.0-4.1); the solvothermal reaction is conducted in DMF; and the organic acid is terephthalic acid.

6. The method of preparing the ternary NiO sheet and bimetallic $CeCuO_x$ sheet core-shell structure composite material according to claim 1, wherein in step (2), a molar ratio of the nickel salt to urea is 1:(5.0-5.1), and the nickel salt is $Ni(NO_3)_2$.

7. The method of preparing the ternary NiO sheet and bimetallic $CeCuO_x$ sheet core-shell structure composite material according to claim 1, wherein in the ternary NiO sheet and bimetallic $CeCuO_x$ sheet core-shell structure composite material, a weight of the NiO sheet is 1-5 times of a weight of the bimetallic $CeCuO_x$ sheet.

* * * * *